United States Patent
Wilkes et al.

(10) Patent No.: US 7,063,465 B1
(45) Date of Patent: Jun. 20, 2006

(54) THRUST BEARING

(75) Inventors: Joseph J. Wilkes, Holland, PA (US); Ascanio M. DeCamillo, Norristown, PA (US)

(73) Assignee: Kingsbury, Inc., Philadelphia, PA (US)

( * ) Notice: Subject to any disclaimer, the term of this patent is extended or adjusted under 35 U.S.C. 154(b) by 14 days.

(21) Appl. No.: 10/394,960

(22) Filed: Mar. 21, 2003

(51) Int. Cl.
*F16C 17/04* (2006.01)
*F16C 32/06* (2006.01)
*F16C 27/08* (2006.01)

(52) U.S. Cl. .................. 384/308; 384/122; 384/223; 384/224; 384/309

(58) Field of Classification Search ............... 384/308, 384/99, 276, 366, 303, 420, 424, 423, 215, 384/223, 224, 225, 220, 221, 222, 227, 228, 384/230, 231, 235, 236, 122, 309, 312
See application file for complete search history.

(56) References Cited

U.S. PATENT DOCUMENTS

| | | | | |
|---|---|---|---|---|
| 1,429,744 A | * | 9/1922 | Kingsbury | 384/306 |
| 2,168,345 A | * | 8/1939 | Kingsbury | 384/368 |
| 2,507,021 A | * | 5/1950 | Lakey | 384/307 |
| 3,062,598 A | * | 11/1962 | Summers | 384/308 |
| 3,132,908 A | * | 5/1964 | Grotzinger | 384/308 |
| 3,652,139 A | * | 3/1972 | Memery | 384/99 |
| 4,432,254 A | * | 2/1984 | Schultz | 74/574 |
| 4,501,505 A | * | 2/1985 | Chambers | 384/152 |
| 4,509,804 A | * | 4/1985 | Klusman | 384/99 |
| 4,515,486 A | * | 5/1985 | Ide | 384/117 |
| 4,981,415 A | * | 1/1991 | Marmol et al. | 415/174.2 |
| 5,215,384 A | * | 6/1993 | Maier | 384/99 |
| 5,613,781 A | * | 3/1997 | Kuzdzal et al. | 384/99 |
| 5,651,616 A | * | 7/1997 | Hustak et al. | 384/99 |
| 6,089,754 A | * | 7/2000 | Wilkes et al. | 384/122 |

* cited by examiner

*Primary Examiner*—Richard W. Ridley
*Assistant Examiner*—Colby Hansen
(74) *Attorney, Agent, or Firm*—John F. A. Earley, III; Frank J. Bonini, Jr.; Harding, Earley, Follmer & Frailey

(57) ABSTRACT

A thrust bearing 11 for use with a shaft 13 having a collar 15 mounted the shaft 13 and rotatable therewith has a base ring 17, a series of shoes 19 positioned on the base ring 17, and a compressible resilient spacing member 29 positioned between the base ring 17 and a housing 31 for the thrust bearing 11. The spacing member 29 supports the thrust bearing 11 when the shaft 13 is rotating during no-load operating conditions, as well as dampens the forces placed on the thrust bearing 11 by the shaft 13 when the shaft 13 is rotating during no-load conditions. The spacing member 29 is sufficiently stiff that it supports the thrust bearing 11 when the shaft 13 is rotating under no-load conditions, but is sufficiently compressible to be compressed to the extent that the gap 33 between the base ring 17 and the housing 31 is eliminated due to the forces placed on the thrust bearing 11 by the shaft 13 bringing the base ring 17 into contact with the housing 31 during normal load operating conditions.

4 Claims, 3 Drawing Sheets

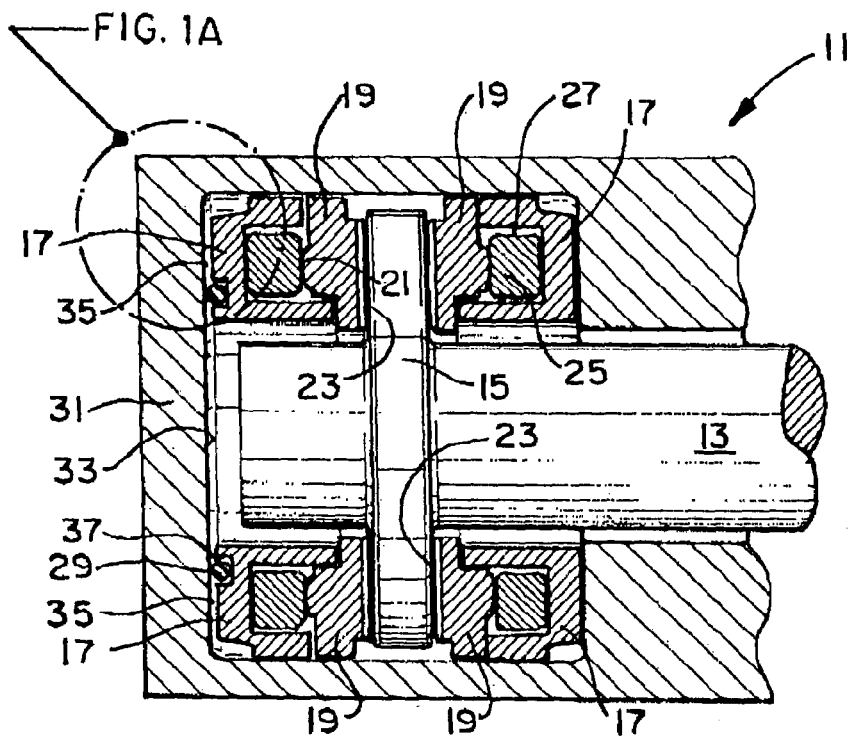
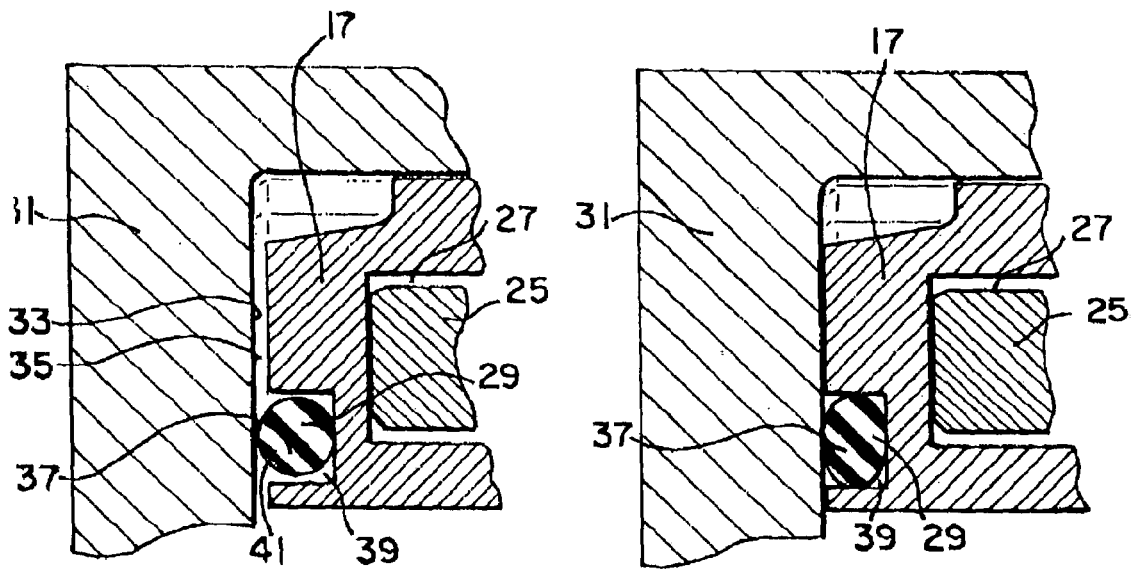
FIG. 1
FIG. 1A
FIG. 1B

THRUST BEARING

BACKGROUND OF THE INVENTION

1. Field of the Invention

This invention relates to thrust bearings, and more particularly concerns directed lube thrust bearings.

2. Description of the Prior Art

Directed lube thrust bearings are now widely received in industry. One such thrust bearing is a thrust bearing designed and manufactured by Kingsbury, Inc., of Philadelphia, Pa., and marketed under the trademark LEG, which has proven to be a great advance in the design of thrust bearings since its introduction to the marketplace. The LEG thrust bearing is disclosed in Kingsbury U.S. Pat. No. 4,501,505, which is incorporated herein by reference.

Vibration of shafts being supported by directed lube thrust bearings beyond acceptable limits is a great concern since such vibration is noisy, and worse, may lead to cracking of the foundations that support the machines of which the shafts are a part. Further, such vibration may cause things, such as the thrust bearings and parts of the machines of which the shafts are a part, to shake, which may lead to damage of these things and failure of the thrust bearings and the machines.

Proper monitoring of shaft vibration to maintain vibration below acceptable limits guards against such possible damage and failure. If shaft vibration is outside the specification for shaft vibration determined for the machine, that is, if the shaft vibration is above acceptable limits, the machine may be shut down. However, when a machine is forced to be shut down, there is a stoppage in productivity of the machine, and in many cases this is costly, and some cases very costly, to a business.

SUMMARY OF THE INVENTION

It is an object of the invention to provide a thrust bearing that substantially eliminates unwanted vibration of a shaft supported by the thrust bearing while the shaft rotates during no-load operating conditions.

This object, as well as other objects, is accomplished by providing a thrust bearing, in a preferred embodiment of the invention, having a base ring, a series of shoes positioned on the base ring, and a compressible spacing member positioned between the base ring and a housing for the thrust bearing. The spacing member supports the thrust bearing when the shaft is rotating during no-load operating conditions, as well as dampens the forces placed on the thrust bearing by the shaft when the shaft is rotating during no-load conditions. The compressible spacing member is sufficiently stiff that it supports the thrust bearing 111 when the shaft 13 is rotating under no-load conditions, but is sufficiently compressible to be compressed to the extent that the gap between the base ring and the housing is eliminated due to the forces placed on the thrust bearing by the shaft bringing the base ring into contact with the housing during normal load operating conditions.

BRIEF DESCRIPTION OF THE DRAWINGS

FIG. 1 is a view in cross-section of a tilting pad thrust bearing constructed in accordance with the invention, showing the thrust bearing in operation when the shaft being supported by the thrust bearing is rotating under no-load or optionally light-load operating conditions;

FIG. 1A is an enlarged view of the portion enclosed in the circle shown in FIG. 1;

FIG. 1B is a view in cross-section of the tilting pad thrust bearing shown in FIG. 1A, showing the thrust bearing in operation when the shaft being supported by the thrust bearing is rotating under normal load operating conditions;

DETAILED DESCRIPTION

Figure 2A:
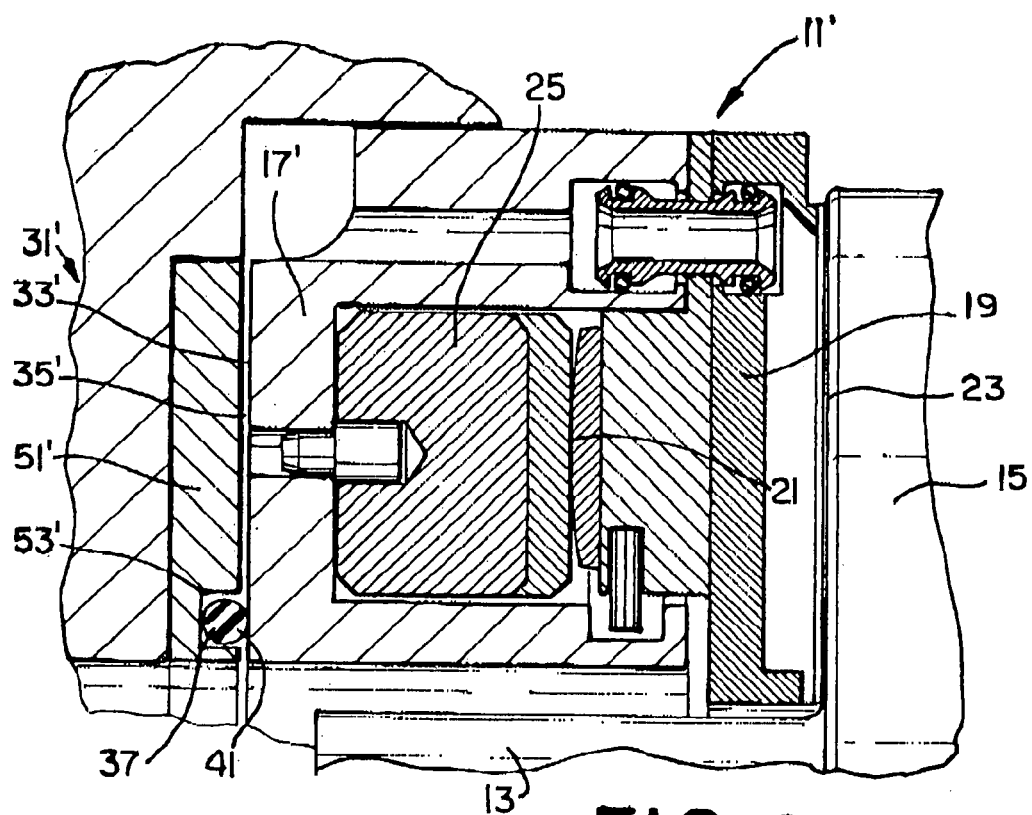
FIG. 2A is a view in cross-section of an alternative embodiment of the tilting pad thrust bearing of the invention, showing the thrust bearing in operation when the shaft being supported by the thrust bearing is rotating under no-load or optionally light-load operating conditions.

Turning now to the drawings, there is shown in FIGS. 1, 1A, and 1B a preferred embodiment of the inventive tilting pad thrust bearing 11 for use with a shaft 13 having a collar 15 mounted on shaft 13 and rotatable therewith. The thrust bearing 11 comprises a base ring 17 and a series of shoes 19 positioned around the base ring 17.

A shoe pivot 21 is mounted on each shoe 19 so as to face away from the working face 23 of the shoe 19, and is provided with a spherical surface to allow the shoe 19 to pivot freely in any direction to conform to the side surfaces of the collar 15.

Mounted between the shoes 19 and the base ring 17 in thrust bearing 11 are a series of leveling plates 25 which are placed around base ring 17 in an annular groove 27.

Shoe pivots 21 bear on the leveling plates 25.

With conventional directed lube thrust bearings, there is a certain amount of clearance between the bearing and the collar, and because of this, unwanted vibration of the shaft may occur when the shaft is rotating during no-load operating conditions. In contrast to conventional directed lube thrust bearings, the thrust bearing 11 of the invention eliminates this unwanted vibration found in conventional directed lube thrust bearings by providing a compressible resilient spacing member 29 that is positioned between the base ring 17 and the housing 31 for the thrust bearing 11 which supports the thrust bearing 11 when the shaft 13 is rotating during no-load operating conditions, and dampens or absorbs the forces placed on the thrust bearing 11 by the shaft 13 when the shaft 13 is rotating during no-load operating conditions. The spacing member 29, as shown in FIGS. 1 and 1A, is sufficiently stiff that it softly supports the thrust bearing 11 when the shaft 13 is rotating during no-load operating conditions which in the embodiment of the invention illustrated in FIGS. 1, 1A, and 1B prevents the base ring 17 from contacting the housing 31 during no-load operating conditions (that is, when shaft 13 is rotating under no-load conditions) and optionally during light-load operating conditions (that is, when shaft 13 is rotating under light-load conditions), but is sufficiently compressible to be compressed, as shown in FIG. 1B, to an extent that the gap 33 between the base ring 17 and the housing 31 is eliminated due to the forces placed on the thrust bearing 11 by the shaft 13 bringing the base ring 17 into contact with the housing 31 during normal load operating conditions (that is, when the shaft 13 is rotating under normal load conditions). By supporting the thrust bearing 11 when the shaft 13 is rotating during no-load operating conditions with the spacing member 29, the forces placed on the thrust bearing 11 by the shaft 13 are dampened and the unwanted vibrations are substantially eliminated. Because the spacing member 29 has compressibility characteristics that permit it to be compressed to the extent that the gap 33 is eliminated during normal load operating conditions, the spacing member 29 does not block the displacement of the base ring 17 into contact with the housing 31 when the shaft 13 is rotating under normal load operating conditions. Also, because the spacing member 29 is resilient, it returns to or substantially to its original shape when no forces are placed on it. Accordingly, when the shaft 13 returns to no-load (or optionally light-load) operating conditions, the spacing member 29 rebounds to support the thrust bearing 11 and dampen the forces placed on the thrust bearing 11 by the shaft 13 while the shaft 13 is rotating during no-load (and optionally light-load) operating conditions.

To assist the spacing member 29 in dampening the forces placed on the thrust bearing 11 by the shaft 13 when the shaft 13 is rotating during no-load (and optionally light-load) operating conditions, oil is provided to fill the gap 33 between the base ring 17 and the housing 31, thereby creating a squeeze film dampener 35. The oil filling the gap 33, like the spacing member 29, acts like a shock absorber to dampen the forces placed on the thrust bearing 11 by the shaft 13 when the shaft 13 is rotating during no-load (and optionally light-load) operating conditions. During normal load operating conditions, the displacement of the base ring 17 into contact with the housing 31, in addition to compressing the spacing member 29, causes the oil to be squeezed out of the gap 33 into other areas, such as the oil annulus, of the thrust bearing 11. When the shaft 13 returns to no-load (and optionally light-load) operating conditions, oil refills the gap 33 as the base ring 17 moves away from the housing 31 due to the spacing member 29 rebounding, with the oil located in the gap 33 again assisting the spacing member 29 in dampening the forces placed on the thrust bearing 11 by the shaft 13 when the shaft 13 is rotating during no-load (and optionally light-load) operating conditions.

In the preferred embodiment of the invention illustrated in FIGS. 1, 1A, and 1B and described herein, the spacing member 29 comprises an O-ring 37, preferably made of rubber or plastic, which is positioned in an annular groove 39 formed in the base ring 17 and extending around the longitudinal axis of the thrust bearing 11 and shaft 13. The O-ring 37 is sized such that a portion 41 protrudes from the groove 39, as shown in FIGS. 1 and 1A, to support the thrust bearing 11 when the shaft 13 is rotating during no-load operating conditions and optionally during light-load operating conditions. In this preferred embodiment of the invention, the spacing member 29 softly supports the thrust bearing 11 and dampens the forces placed on the thrust bearing 11 by the shaft 13 during no-load and optionally light-load operating conditions by absorbing such forces with the compressible resilient O-ring 37. That is, the compressibility characteristics of the O-ring 37 are such that, during no-load and optionally during light-load operating conditions, the O-ring 37 is stiff enough to support the thrust bearing 11 and dampen the forces placed on the thrust bearing 11 by the shaft 13. However, when the shaft 13 is rotating under normal load conditions, the compressibility characteristics of the spacing member 29 are such that the forces on the spacing member 29 are great enough to compress the spacing member 29 enough (that is, the forces on the O-ring 37 are great enough to compress the O-ring 37 enough so that portion 41 no longer protrudes from the groove 39, as shown in FIG. 2B) to eliminate the gap 33, thereby permitting the base ring 17 to come into contact with the housing 31.

As indicated above, the preferred spacing member 29 is an O-ring. However, other forms of the spacing member 29 include a spring or springs spaced between the base ring 17 and the housing 31 that has or have sufficient compressibility characteristics that the spacing member 29 supports the thrust bearing 11 during no-load and optionally light-load operating conditions because the forces on the spring or springs are not great enough to overcome the force of the spring or springs to bring the base ring 17 into contact with the housing 31, and is sufficiently compressed during normal load operating conditions by the forces on the spring or springs being great enough to overcome the force of the spring or springs to bring the base ring 17 into contact with the housing 31.

Another form of the spacing member 29 is a reservoir of a high pressure oil positioned between the base ring 17 and the housing 31.

Another form of the spacing member 29 is a rubber washer having a portion that protrudes from the groove 39, as portion 41 of the O-ring 37 protrudes from the groove 39.

The common element of each form of spacing member 29 is that the spacing member 29 has sufficient compressibility characteristics to support the thrust bearing 11 and to dampen the forces placed on the thrust bearing 11 by the shaft 13 during no-load and optionally light-load operating conditions, but to permit metal to metal contact between the thrust bearing 11 and the housing 31 during normal load operating conditions due to the spacing member 29 being more fully compressed. During no-load operating conditions, the spacing member 29 supports the thrust bearing 11 and dampens the forces placed on the thrust bearing 11 by the shaft 13.

It should be noted that the gap 33 is considered to be eliminated when the base ring 17 comes into contact with the housing 31 or the base ring 1,7 and the housing 31 are brought sufficiently close to one another that the shaft 13 may rotate properly during normal load operating conditions.

In operation, when the shaft 13 is rotating during no-load (and optionally light-load) conditions, the spacing member 29, which is in contact with the base ring 17 and the housing 31, supports the thrust bearing 11 and dampens the forces placed on the thrust bearing 11 by the shaft 13, thereby eliminating the vibration problem associated with conventional directed lube thrust bearings. The dampening of the forces placed on the thrust bearing 11 by the shaft 13 is enhanced by the squeeze film damper 35. When the shaft 13 is rotating during normal load operating conditions, the spacing member 29 compresses and the oil located in gap 33 is squeezed out of gap 33 as the base ring 17 is displaced to permit the base ring 17 to be in contact with the housing 31 while the shaft 13 rotates during normal load operating conditions. When the shaft 13 returns to no-load (and optionally light-load) operating conditions, oil refills the gap 33 as the base ring 17 moves away from the housing 31 due to the spacing member 29 rebounding, with the oil located in gap 33 again assisting the spacing member 29 in dampening the forces placed on the thrust bearing 11 by the shaft 13 when the shaft 13 is rotating during no-load (and optionally light-load) operating conditions.

Figure 2B:
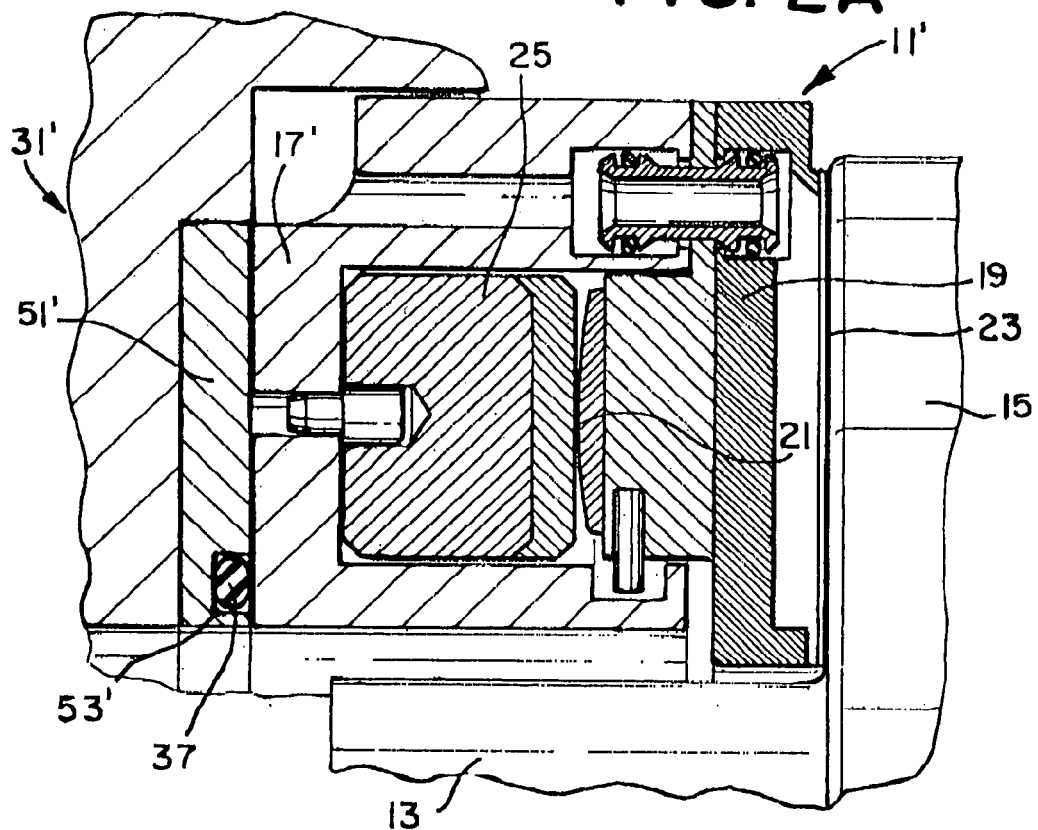
FIG. 2B is a view in cross-section of the alternative embodiment of the thrust bearing shown in FIG. 2A, showing the thrust bearing in operation when the shaft being supported by the thrust bearing is rotating under normal load operating conditions.

Turning now to FIGS. 2A and 2B, an alternative embodiment of the invention is shown. In this embodiment of the invention, a thrust bearing 11' comprises a base ring 17' and a series of shoes 19 positioned around the base ring 17'. The housing 31' is provided with an O-ring retainer 51', which has an annular groove 53' formed therein for receiving an O-ring 37. During no-load (and optionally light-load) operating conditions, the O-ring 37, which has a portion 41 protruding from the groove 53', supports the thrust bearing 11' and dampens the forces placed on the thrust bearing 11' by the shaft 13. The squeeze film damper 35' assists the O-ring 37 in dampening the forces placed on the thrust bearing 11' when the shaft 13 is rotating during no-load (and optionally light-load) operating conditions. During normal load operating conditions, the O-ring 37 compresses and the oil located in gap 33' is squeezed out of the gap 33' as the base ring 17' is displaced to permit the base ring 17' to be in contact with the housing 31' while the shaft 13 rotates during normal load operating conditions. When the shaft 13 returns to no-load (and optionally light-load) operating conditions, oil refills the gap 33' as the base ring 17' moves away from the housing 31' due to the O-ring 37 rebounding, with the oil located in gap 33' assisting the O-ring 37 in dampening the forces placed on the thrust bearing 11' by the shaft 13 when the shaft 13 is rotating during no-load (and optionally light-load) operating conditions.

Figure 3:
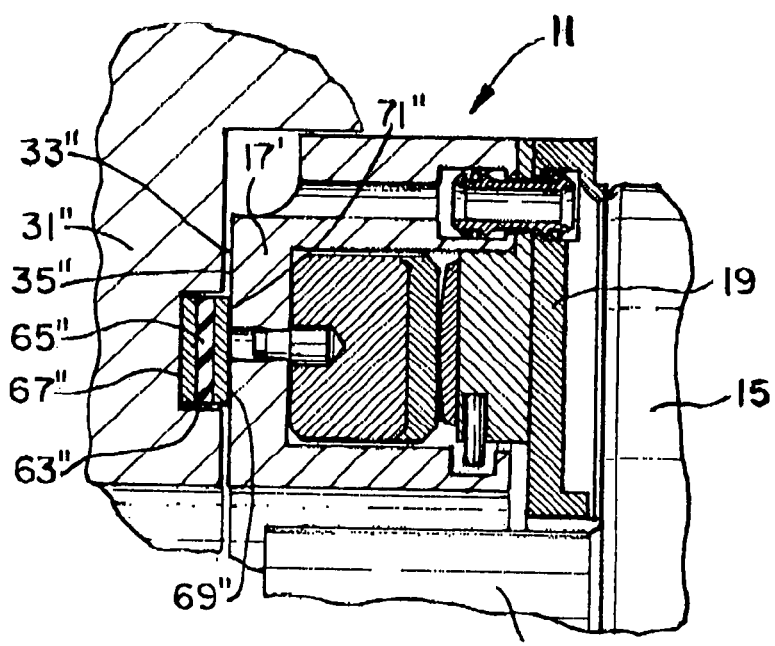
FIG. 3 is a view in cross-section of another alternative embodiment of the invention.

Turning now to FIG. 3, another alternative embodiment of the invention is shown. In this embodiment of the invention, a thrust bearing 11" comprises a base ring 17' and a series of shoes 19 positioned around the base ring 17'. The housing 31" is provided with a recess 63" for receiving a compressible resilient piece or strip 65", preferably made of rubber or plastic, positioned, and preferably molded, between a first plate 67", preferably made of steel, and a second plate 69", preferably made of steel. The compressible resilient piece 65", the first plate 67", and the second plate 69" are positioned in the recess 63". The second plate 69" has a portion 71" that protrudes from the recess 63" and contacts the base ring 17'. During no-load (and optionally during light-load) operating conditions, the combination of the steel plates 67" and 69" and the compressible resilient piece 65" supports the thrust bearing 11" and dampens the forces placed on the thrust bearing 11" by the shaft 13 by absorbing such forces with the compressible resilient piece 65". During normal load operating conditions, the compressible resilient piece 65" compresses and the oil located in the gap 33" is squeezed out of the gap 33" as the base ring 17' is displaced to permit the base ring 17' to be in contact with the housing 31" while the shaft 13 rotates during normal load operating conditions. When the shaft 13 returns to no-load (and optionally light-load) operating conditions, oil refills the gap 33" as the base ring 17' moves away from the housing 31" due to the compressible resilient piece 65" rebounding, with the oil located in gap 33" assisting the compressible resilient piece 65" in dampening the forces placed on the thrust bearing 11" by the shaft 13 when the shaft 13 is rotating during no-load (and optionally light-load) operating conditions.

Figure 4:
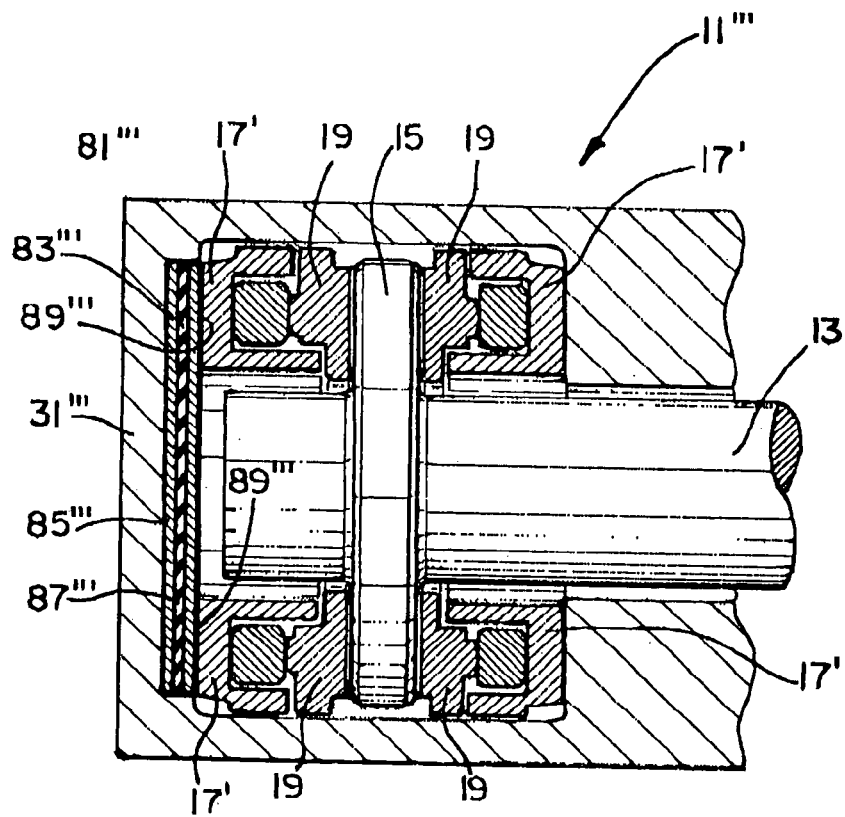
FIG. 4 is a view in cross-section of another alternative embodiment of the invention.

Turning now to FIG. 4, another embodiment of the invention is shown. In this embodiment of the invention, a thrust bearing 11''' comprises a base ring 17' and a series of shoes 19 positioned around the base ring 17'. The housing 31''' is provided with a cylindrical recess 81''' for receiving a circular compressible resilient disk 83''', preferably made of rubber or plastic, positioned, and preferably molded, between a first circular plate 85''', preferably made of steel, and a second circular plate 87''', preferably made of steel. The compressible resilient disk 83''', the first plate 85''', and the second plate 87''' are positioned in the recess 81'''. The second plate 87''' has a portion 89''' that contacts the base ring 17'. During no-load (and optionally during light-load) operating conditions, the combination of the plates 85''' and 87''' and the disk 83''' supports the thrust bearing 11''' and dampens the forces placed on the thrust bearing 11''' by the shaft 13 by absorbing such forces with the compressible resilient disk 83'''. During normal load operating conditions, the compressible resilient disk 83''' compresses as the base ring 17' is displaced to permit the base ring 17' to be brought sufficiently close to the housing 31''' that the shaft 13 rotates properly during normal load operating conditions. When the shaft 13 returns to no-load (and optionally light-load) operating conditions, the compressible resilient disk 83''' rebounds and dampens the forces placed on thrust bearing 11''' by the shaft 13 while the shaft 13 rotates during no-load (and optionally light-load) operating conditions.

The invention claimed is:

1. A thrust bearing for use with a shaft having a collar mounted thereon, comprising
   a series of shoes,
   structural support including a housing and a base ring for supporting the shoes,
   the series of shoes being positioned around the base ring,
   a shoe pivot member on each shoe allowing the shoe to pivot in any direction,
   a squeeze film dampener positioned in the structural support for dampening forces placed on the thrust bearing by the shaft when the shaft is rotating during light-load operating conditions,
   an annular groove formed in the structural support at the squeeze film dampener, and
   a compressible resilient spacing member positioned in the annular groove, the compressible resilient spacing member having a portion that protrudes from the groove and engages a portion of the structural support opposite the groove to seal the squeeze film dampener and to dampen forces placed on the thrust bearing by the shaft when the shaft is rotating during light-load operating conditions, the compressible resilient spacing member having sufficient compressibility for dampening forces placed on the thrust bearing by the shaft during light-load operating conditions and for permitting the compression of the compressible resilient spacing member into the groove during normal operating conditions.

2. The thrust bearing of claim 1,
   the base ring having an annular groove extending around its longitudinal axis, and
   the spacing member being an O-ring that is positioned in the groove and that has a portion that protrudes from the groove to contact the housing.

3. The thrust bearing of claim 1, further including
   a squeeze film dampener between the base ring and the housing for assisting the spacing member in dampening the forces placed on the thrust bearing by the shaft when the shaft is rotating during light-load operating conditions.

4. The thrust bearing of claim 1, further including
   a series of leveling plates for equalizing the load on the series of shoes.

* * * * *